United States Patent [19]

Wilkerson et al.

[11] Patent Number: 4,467,144

[45] Date of Patent: Aug. 21, 1984

[54] TELEPHONE ANNUCIATOR EXTENDER

[75] Inventors: Timothy M. Wilkerson, Princeton; Edward B. Learned, Evansville, both of Ind.

[73] Assignee: AMF Incorporated, White Plains, N.Y.

[21] Appl. No.: 366,460

[22] Filed: Apr. 8, 1982

[51] Int. Cl.³ .............................................. H04M 1/26
[52] U.S. Cl. ................................ 179/84 R; 179/2 A; 179/84 T
[58] Field of Search ................. 179/84 R, 84 L, 84 T, 179/84 A, 2 A, 2.51

[56] References Cited

U.S. PATENT DOCUMENTS 4,046,970  9/1977  Castleman ......................... 179/84 L
4,049,916  9/1977  Danner ........................... 179/84 R X
4,074,081  2/1978  Humm ............................. 179/84 R Primary Examiner—A. D. Pellinen
Assistant Examiner—James L. Dwyer
Attorney, Agent, or Firm—Willian, Brinks, Olds, Hofer, Gilson & Lione

[57] ABSTRACT

Apparatus for the activation of a remotely located device, such as a lamp or bell, under the control of telephone subscriber tip and ring lines. The apparatus of the present invention is located in the general vicinity of a called telephone subscriber station and is operated to activate and power a remotely located annunciator as a function of detecting ringing signals initiated by a calling telephone subscriber station. The apparatus plugs into a wall outlet for providing actuating power to the remote annunciator(s).

10 Claims, 4 Drawing Figures

TELEPHONE ANNUCIATOR EXTENDER

BACKGROUND OF THE INVENTION

The invention relates generally to ringing circuits for telephones and, more particularly, to apparatus for activating and deactivating a remotely located device or annunciator in response to the ringing of a called telephone subscriber station.

Heretofore, control systems have been utilized to control the operation of various remote devices. Typically, these devices required the telephone subscriber lines to operate and power the remotely located devices. However, such control systems were inherently limited to relatively low power applications due to loading limitations on the subscriber lines.

PRIOR ART STATEMENT

In one prior art device as described in U.S. Pat. No. 3,783,193 issued Jan. 1, 1974 to Martin Lee, actuation of the remote devices is delayed for a period to determine whether a predetermined code or ring sequence has been generated by the subscriber station for the purpose of obviating activation of the remotely located device by false or unintended signals.

In another prior art remote telephone ring signaling system as described in U.S. Pat. No. 2,608,614 issued Aug. 26, 1952 to John E. Williams, an acoustic or electromagnetic transducer is used to detect a single telephone ringing signal frequency.

Other prior art patents of interest include: U.S. Pat. Nos. 4,031,332 issued June 21, 1977 to Paul Shylo; 3,946,328 issued Mar. 23, 1976 to Stalin A. Boctor; 3,816,669 issued June 11, 1974 to Kalju Meri; 3,808,379 issued Apr. 30, 1974 to Paul U. Lind; 3,532,822 issued Oct. 6, 1970 to E. W. O'Hanlon; 3,748,401 issued July 24, 1973 to Robert G. Pesy et al; 3,487,231 issued Dec. 30, 1969 to L. H. Dixon Jr. and 2,428,007 issued Sept. 30, 1947 to E. M. Boardman.

The above patents are mentioned as being representative of the prior art and other pertinent references may exist. None of the above noted patents are deemed to affect the patentability of the present claimed invention.

In contrast to the prior art, the preferred embodiment of the present invention provides for the electrical detection of the ringing signal, uses photo-isolation devices to segregate the tip and ring circuit from the power source of the control circuit for the remote annunciator(s), powers the remote annunciator(s) from a source other than the ringing signal source, and includes means for detecting and discriminating between dial pulses and a ring signal. A further feature of the preferred embodiment is a D.C. power source which utilizes a voltage dropping capacitive impedance between an A.C. power source and a D.C. power source to minimize power/heat dissipation within the control system.

SUMMARY OF THE INVENTION

Generally speaking, the present invention comprises apparatus for activating a remotely located device(s) under the control of telephone ringing signals. The apparatus according to the preferred embodiment of the invention generally comprises: a telephone line interface circuit, a signal detector and discriminator circuit for deriving ringing signal frequency information while discriminating against dial pulses, a dual A.C./D.C. power supply circuit for providing a D.C. source of power to the signal detector and discriminator circuit and for providing an A.C. source of power to an A.C. switch device having switch terminals connected to a remotely located annunciator device and a control switch input connected to the detector and discriminator for receiving a switch open and close control signal substantially coincidental with and in response to the detected ringing signals on the called telephone subscriber station.

Accordingly, it is an object of the present invention to provide a new and improved telephone ring signal detector.

Another object of the invention is to provide a telephone ring signal detector which is simple in construction and economical to manufacture.

Another object of the invention is to provide a ring signal detector which has improved timing integrity relative to the ring signal frequency information.

Another object of the invention is to provide a ring signal detector which is responsive to the spectrum of ring signal frequencies utilized typically to annunciate an incoming call to a subscriber station.

Another object of the invention is to provide a telephone annunciator extender which functions to provide actuation power to an annunciator at a remote location coincidental with a detected ringing signal on a called telephone subscriber station.

A further object of the invention is to provide a new and improved circuit means for detecting a ring signal and for actuating a remote annunciator in response thereto.

BRIEF DESCRIPTION OF THE DRAWINGS

Other objects and advantages of the invention may be more clearly seen when viewed in conjunction with the accompanying drawings. Similar reference numerals refer to similar elements throughout.

DESCRIPTION OF THE PREFERRED EMBODIMENT

Figure 1:
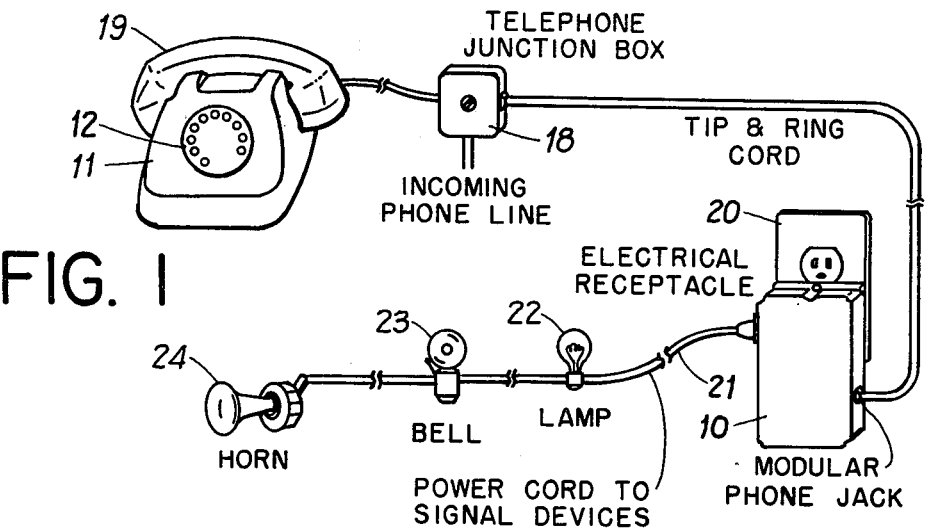
FIG. 1 is a perspective view of the telephone annunciator extender system utilizing a plurality of remotely located annunciator devices.

Illustrated in FIG. 1 is a telephone annunciator extender system 10 in accordance with the present invention, which employs conventional telephone subscriber lines and stations. For example, the typical telephone subscriber station 11 has an operator dial 12 to initiate a call at the calling telephone subscriber station (not shown) through conventional telephone equipment 18 for establishing and completing connections between the calling telephone subscriber station and a called telephone subscriber station. In so doing, the operator through the telephone instrument at the calling subscriber station dials successively the number of a desired called telephone subscriber station 11, which results in the generation of a series of ringing signals over the tip and ring lines at the called telephone subscriber station 11, with the handset 19 being in the cradle thereof. Located in the general vicinity of the called telephone subscriber station 11 is apparatus 10 according to the present invention. The telephone annunciator extender unit 10 is plugged into a typical wall outlet 20 for being supplied with, for example, 120 volts of A.C. power. The telephone annunciator extender unit 10 is connected, via junction box or other telephone equipment 18, to the tip and ring lines of the associated telephone subscriber station 11. A power cord 21 connects the telephone annunciator extender 10 to one or more remotely located annunciators such as lamp 22 and/or bell 23 and/or horn 24.

Figure 2:
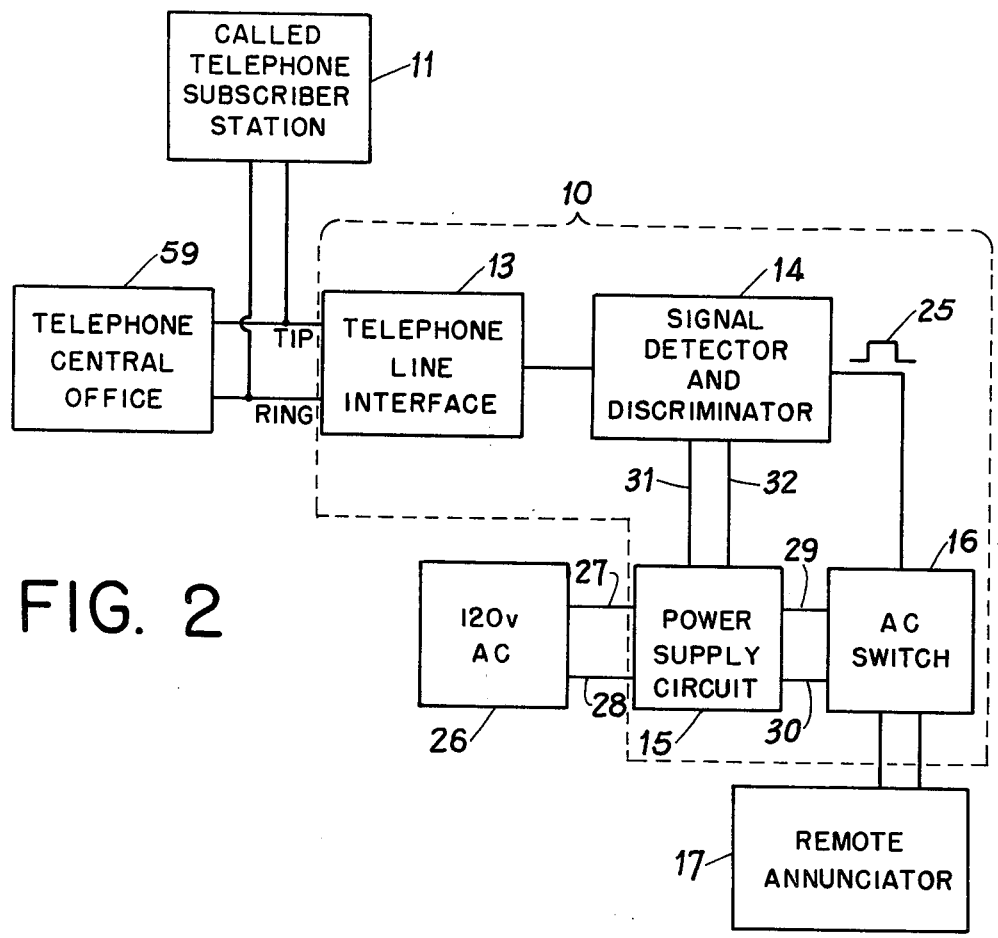
FIG. 2 is a block diagram of the telephone annunciator extender interfacing with the tip and ring lines associated with a telephone subscriber station and connected to a remote annunciator.

With reference to FIG. 2, a block diagram of the telephone annunciator extender system in accordance with the present invention is shown. Basically, the preferred embodiment of the telephone annunciator extender 10 (shown in phantom outline), comprises a telephone line interface circuit 13, a signal detector and discriminator circuit 14, a power supply circuit 15 and an A.C. switch device 16. The telephone line interface circuit 13 includes circuit means for coupling both the dial pulses and ringing signals on the tip and ring lines associated with the called telephone subscriber station 11 to the signal detector and discriminator circuit 14, while substantially blocking the D.C. signal/power elements on the tip and ring lines. The signal detector and discriminator 14 comprises circuitry for detecting and discriminating the ringing signals from the dial pulses, and provides a switch open/close control signal 25 for activating the A.C. switch 16 in response thereto. The power supply circuit 15 is connected, via terminal or leads 27 and 28, to a conventional 120 volt A.C. source of power 26 and includes circuit means for coupling the 120 volt A.C. power, via leads 29 and 30, to the A.C. switch 16, and for rectifying the A.C. power to provide, via leads 31 and 32, a suitable source of D.C. voltage/current to the signal detector and discriminator circuit 14. In response to the switch control signal 25, the A.C. switch 16 provides or couples the A.C. power source 26 to the remote 17 for activation thereof with detection of ringing signals at the called telephone subscriber station 11.

Figure 3:
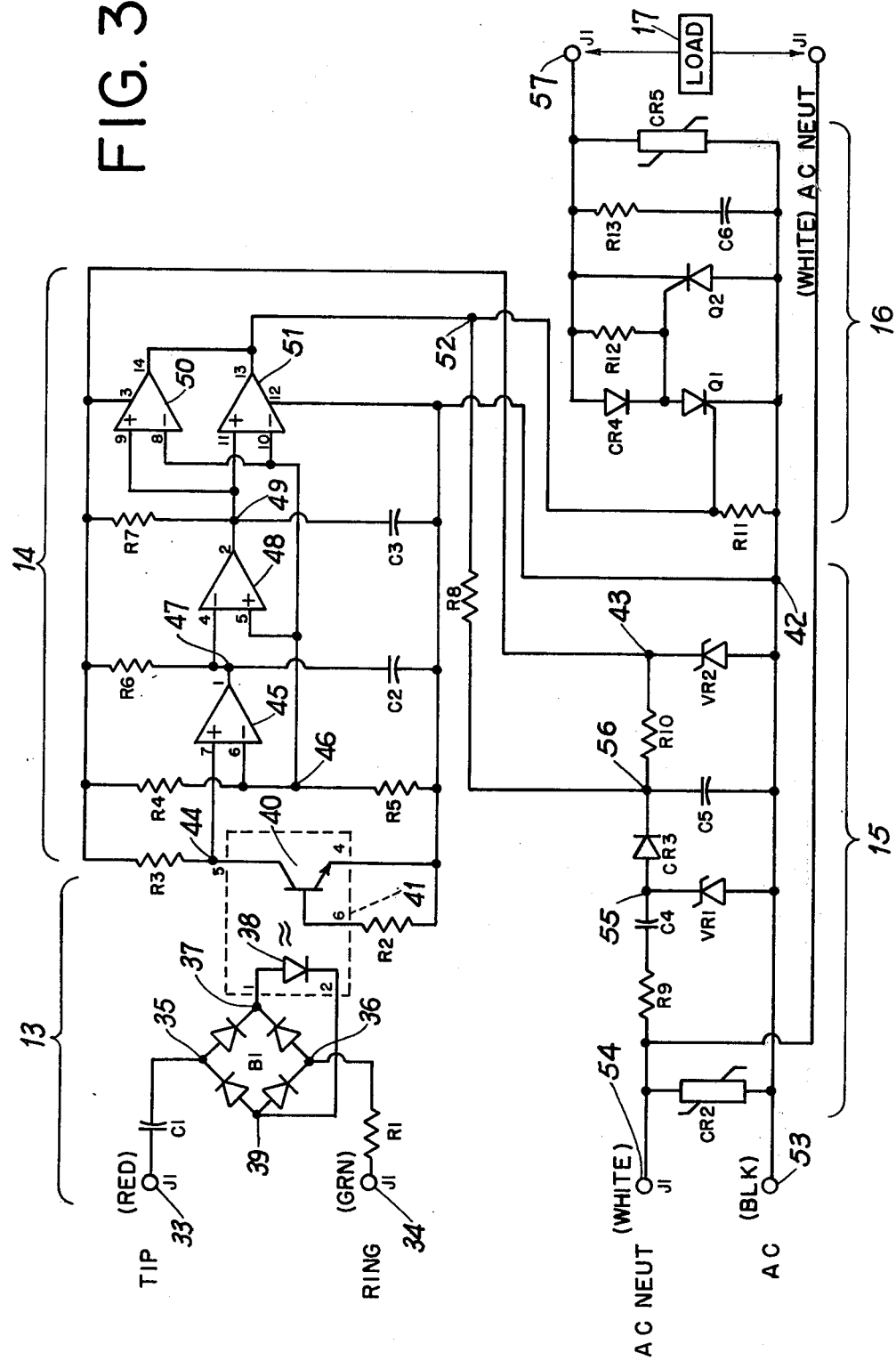
FIG. 3 is a schematic diagram of the apparatus of the preferred embodiment of the present invention for activating a remotely located annunciator device.

With reference to FIG. 3, the circuit details of the telephone annunicator extender 10 will now be described. The telephone line interface circuit 13 is connected to the tip and ring lines associated with the called telephone subscriber staion 11, via interface terminals 33 and 34, respectively. Terminal 33 is connected, via D.C. blocking capacitor C1, to A.C. terminal 35 of a full wave bridge rectifier B1. Terminal 34 is connected through resistor R1 to the other A.C. terminal 36 of bridge rectifier B1. The positive (D.C.) junction point 37 of bridge rectifier B1 is connected to the anode terminal of photo-diode 38. The cathode terminal of photo-diode 38 is connected to the negative (D.C.) junction point 39 of bridge rectifier B1.

The signal detector and discriminator 14 is coupled to the signal output of photo-diode 38 by means of photo coupling to transistor 40. The photo-diode 38 and transistor 40 comprise an optocoupler device 41 (shown in phantom outline) such as a 4N35 optocoupler manufactured by General Electric. The base terminal of transistor 40 is connected through resistor R2 to the circuit common lead 42. The emitter of transistor 40 is connected to circuit common lead 42, while its collector is connected, via resistor R3, to the positive supply rail 43 of the D.C. power supply circuit 15. The common junction 44 between resistor R3 and the collector of transistor 40 is connected to the non-inverting terminal (+) of comparator/op-amp 45. The inverting terminal (−) of comparator 45 is connected to the common junction 46 between resistors R4 and R5. Resistors R4 and R5 are connected in series between the positive and common terminal leads 42 and 43 of the D.C. power supply 15. The output of comparator 45 is connected to the common junction 47 between capacitor C2, resistor R6 and the inverting terminal (−) of comparator 48. Resistor R6 and capacitor C2 are connected in series across the positive and common terminal leads 42 and 43 of the D.C. power supply 15. The non-inverting terminal (+) of comparator 48 is connected to circuit point 46. The output of comparator 48 is connected to the common junction 49 between resistor R7, capacitor C3 and the non-inverting terminals (+) of comparators 50 and 51. The inverting terminals (−) of comparators 50 and 51 are connected to circuit point 46. Resistor R7 and capacitor C3 are connected in series across the positive and common terminal leads 42 and 43 of the D.C. power supply 15. The outputs of comparators 50 and 51 are connected together and to circuit point 52 which is connected to the A.C. switch 16 and to circuit point 56, via resistor R8.

The D.C. power supply 15 may be connected to a source of 120 volt A.C., via terminal leads 53 and 54, which serves to power the remotely located annunciator(s) and, following rectification, to power the circuit logic of the signal detector and discriminator 14. Metal oxide varistor CR2 is connected across terminals 53 and 54. Resistor R9, capacitor C4 and zener diode VR1 are connected in series across varistor CR2, with zener diode VR1 having its anode connected to circuit point 53 and its cathode connected to circuit point 55 with resistor R9 and capacitor C4 being connected between circuit points 54 and 55. Diode CR3 and capacitor C5 are forward biased connected in series across circuit points 53 and 55. Resistor R10 and zener diode VR2 are connected in series between circuit points 53 and 56, with zener diode VR2 having its anode connected to circuit point 53. DC/AC terminal circuit point 42 is connected to A.C. input terminal 53.

The A.C. switch 16 may comprise any suitable A.C. switch circuit of which several conventional designs are available. An example of one such A.C. switch circuit is shown and described in product specification "Power integrated Circuits PIC 100, PIC 101, PIC 102 and PIC 103" by Unitrode Corporation. Accordingly, thyristor Q1 has its anode connected through diode CR4 and the load (annunciator), via circuit point 57, to A.C. terminal/circuit point 54. Diode CR4 is connected in the same polarity as thyristor Q1. Thyristor Q2 is connected with opposite polarity to that of thyrisor Q1, with its cathode connected to load/annunciator 17, and its anode connected to a source of reference potential terminal 42, and its gate electrode connected to the anode of thyristor Q1. The gate electrode of thyristor Q1 is connected to a trigger source, i.e., the output pulses 25 from the signal detector and discriminator 14, via circuit point 52. Resistor R11 is connected between the gate electrode of thyristor Q1 and circuit point 42. Resistor R12 is connected between the gate electrode of thyristor Q2 and circuit point 57. Resistor R13 and capactor C6 are connected in series across circuit points 42 and 57. Metal oxide varistor CR5 is connected across circuit points 42 and 57.

OPERATION

As noted above, the power supply circuit 15 is designed to present a source of A.C. voltage to energize, via A.C. switch 16 and circuit points or terminals 57 and 54, the load/annunciator(s) 17 and to also provide a source of D.C. power across circuit points 42 and 43 to power the logic elements of the signal detector and discriminator circuit 14. With application of, for example, 120 volts of A.C. across terminals 53 and 54, a regulated D.C. potential is established across circuit points 42 and 43. With each positive half cycle of the A.C. input, a charging current is provided through resistor R9, capacitor C4 and diode CR3 to charge capacitor C5 with a positive (+) potential at circuit point 56. Resistor R9 functions as a current limit device during this charging operation. The basic function of zener diode VR1 is to limit the peak voltage across capacitor C5 and to discharge capacitor C4 during the negative half cycles of the A.C. input power. The positive charge (+) established on capacitor C5 is prevented from being discharged through capacitor C4 during negative half cycles of the A.C. as a result of diode CR3 being then in a back biased state. Capacitor C4 also functions as a voltage dropping impedance between the A.C. and D.C. power thereby minimizing heat dissipation within the telephone annunciator extender 10. Capacitor C5 provides a source of unregulated D.C. potential through resistors R8 and R10. This unregulated D.C. potential is regulated by the operation of zener diode VR2 to provide a regulated source of D.C. potential on circuit point 43.

Figure 4:
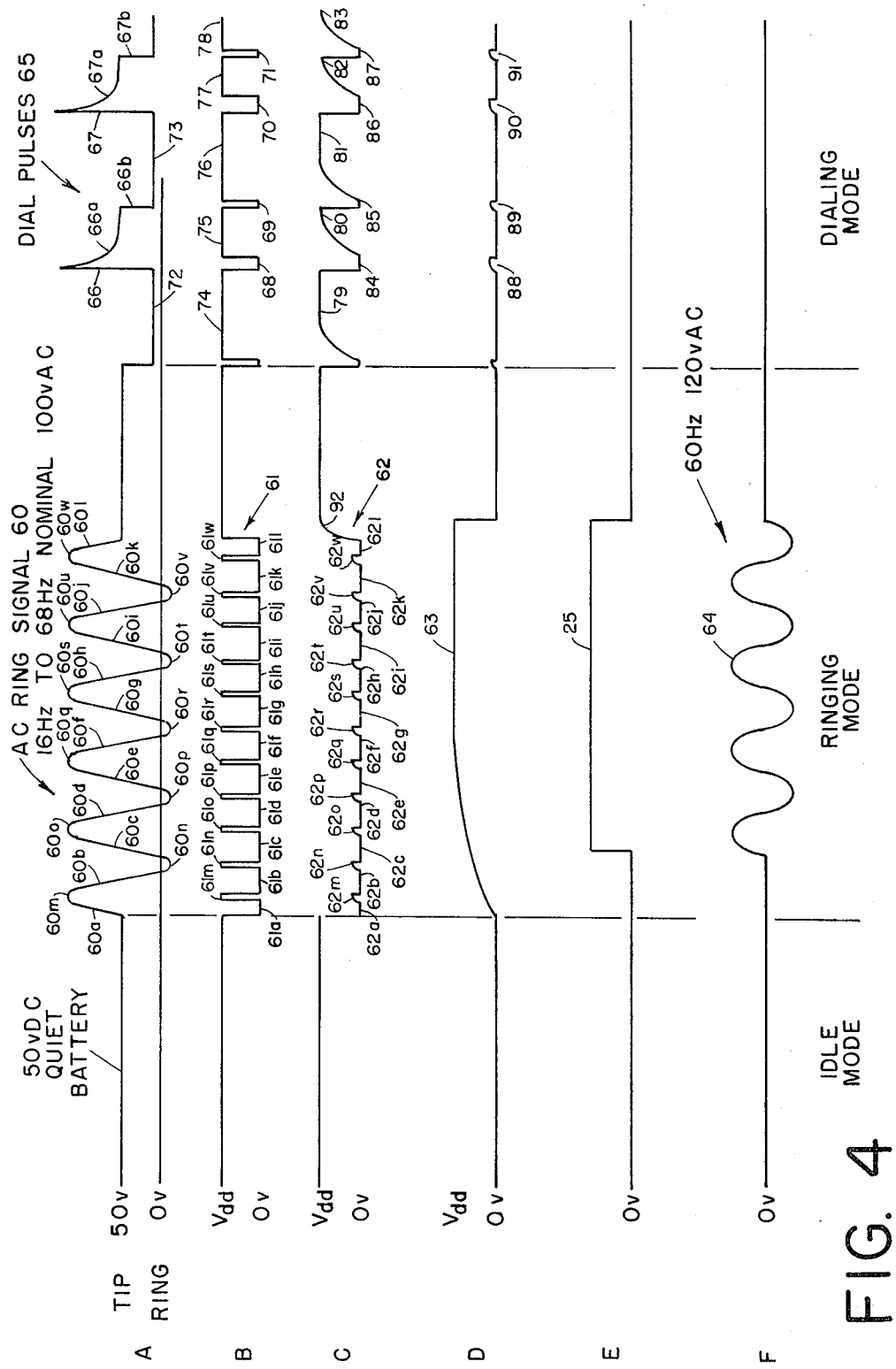
FIGS. 4A–4F illustrate the waveforms of the signals being processed or developed within the circuit shown in FIG. 3.

Assuming that power has been applied as discussed above, the operation of the telephone annunciator extender 10 will now be described with respect to its three primary modes of operation, with reference to FIGS. 3 and 4. The three primary modes of operation may be defined as (1) an idle mode, (2) a ringing mode and (3) a dialing mode. The idle mode exists when the device 10 is active and monitoring the telephone tip and ring lines but no pertinent, i.e., no ring or dial pulse, signal information is present on the lines. The ring mode exists when a ring signal is detected or sensed on the telephone tip and ring lines. The dialing mode exists when dial pulses are detected on the telephone tip and ring lines.

During idle modes with no incoming or outgoing calls being placed, an approximate 50 volt D.C. potential (see FIG. 4A idle mode) is maintained between the tip and ring lines by the telephone system 59. This potential is applied across terminals 33 and 34 of the telephone line interface circuit 13. Capacitor C1 functions to block this D.C. current thereby substantially preventing a power drain from the telephone lines which may otherwise degrade the proper operation of the associated telephone subscriber station 11. Photo-coupler 41 is, therefore, in an off state which causes a Vdd or positive supply rail 43 potential (see FIG. 4B idle mode) to be applied, via resistor R3 on circuit point 44. Since circuit point 46 is the junction between a voltage divider network formed by resistors R4 and R5, a predetermined reference voltage is established on the inverting inputs of comparators 45, 50 and 51 and on the non-inverting input of comparator 48. The reference voltage is determined by the relative values of resistors R4 and R5 and the potential across the positive supply rail 43 and circuit common 42. With the reference voltage selected such that the non-inverting input (circuit point 44) of comparator 45 is higher than the potential on its inverting input (circuit point 46), the output of comparator 45 is in an off-state, i.e., in the open collector mode. With comparator 45 turned off, capacitor C2 (see circuit point 47) will charge to the positive supply rail 43 potential Vdd (FIG. 4C idle mode). This Vdd potential is applied to the inverting input of comparator 48. And since the Vdd potential on the inverting input of comparator 48 is higher than the potential on its non-inverting input (due to the voltage divider action at circuit point 46), comparator 48 is switched to the on-state, i.e., a closed collector or conducting state. With comparator 48 turned on, circuit point 49 and, therefore, capacitor C3 are shunted or coupled to circuit common 42 potential (see FIG. 4D idle mode). With the non-inverting inputs of comparators 50 and 51 being connected to circuit point 49, they are at a lower potential than their respective inverting inputs, which causes their outputs, both connected to circuit point 52, to be in the on-state, i.e., conductive. The on-state of comparators 50 and 51 shunts resistor R8 current away from A.C. switch 16, i.e., connects circuit common potential to circuit point 52, to disconnect the load annunciator(s) 17 from the A.C. power source 26 (see FIG. 4F idle mode).

With the subscriber station 11 being placed in a ringing mode, the A.C. ring signals 60 on the tip and ring lines are coupled to terminals 33 and 34 of the telephone line interface circuit 13. The input signal potentials present on the tip and ring lines during a ringing mode consists of two basic signal components VIZ: a 50 volt D.C. previously discussed and a superimposed A.C. ring signal 60 having a frequency generally between 16 and 68 hertz (see FIG. 4A ringing mode). As noted above, the D.C. potential is blocked by capacitor C1. Capacitor C1 and resistor R1 are selected, emperically or through calculation, to have a value such that the voltage varying signal portions 60a–60l of the A.C. ring signals 60, which have a predetermined time-rate-of-change, e.g., corresponding to the cos. $2\pi$ ft where f equals a frequency of 15 to 68 hertz, are coupled across the bridge network B1 to cause a corresponding current to flow through bridge network B1 and diode 38. This current flow is interrupted, however, at the voltage peaks 60m–60w of each ringing signal 60 due to the slope of its waveform approaching zero, i.e., a zero time-rate-of-change, before reversing direction. During each voltage varying signal 60a–60l a corresponding current is established through diode 38 which turns transistor 40 to the ON state and, thereby, causes circuit point 44 to approach circuit common potential of approximately zero volts, resulting in the production of a plurality of corresponding pulses 61a–61l at circuit point 44. Each zero potential pulse 61a–61l has a duration generally corresponding with the period of a respective voltage varying signal portion 60a–60l (from about 3.5 milliseconds to about 33 milliseconds). During the voltage peaks 60m–60w of the ringing signal 60, current is interrupted through diode 38 as noted above which causes transistor 40 to turn-off, i.e., become non-conductive. With transistor 40 in the off-state, circuit point 44 approaches the positive supply rail 43 potential producing positive pulses 61m–61w. Following each voltage peak of the ringing signals, a current through diode 38 is restored turning transistor 40 on again and, thereby, placing circuit point 44 at circuit common potential. Signal/pulse 61 generation at circuit point 44 may be more clearly understood with reference to FIGS. 4a and 4b during the ringing mode.

The generate pulses 61a–61l at circuit point 44, i.e., pulses shown in FIG. 4B ringing mode, are used as timing pulses to eastablish a timing base for a first retrigerable timer circuit comprising comparator 45, resistor R6, capacitor C2 and the reference voltage established at the junction of resistors R4 and R5 (circuit point 46). Timing is initiated at the rising edge of each (positive level) pulse 61m–61w and reset occurs during each zero level pulse 61a–61l. For example, during the leading edge of one such pulse 61m, the potential on the non-inverting input (+) of comparator 45 is higher than on its inverting (−) input causing its output to turn-off, i.e., an open collector state. This enables capacitor C2 to begin charging through resistor R6. During the trailing or falling edge of pulse 61m, comparator 45 is turned-on, i.e., placed in a closed or conducting collector state. This results in the discharge of capacitor C2 and, therefore, resetting of the first timer to a zero time base. In the preferred embodiment, the time constant of capacitor C2 and resistor R6 has been selected such that capacitor C2 does not fully charge to supply rail 43 potential, i.e., time-out, during a ring signal(s) 60. This is illustrated by the relatively low voltage pulses 62m–62w shown in FIG. 4C ringing mode. Since capacitor C2 is discharged during pulses 61a–61l, which correspond to a respective voltage varying signal portion 60a–60l of the ringing signal 60, the potential on the non-inverting (+) input of comparator 48 is higher than on its inverting (−) input causing comparator 48 to turn-off, i.e., have an open collector. This enables capacitor C3 to begin charging up to the potential of supply rail 43 via resistor R7. In this manner, a second retriggerable timer is provided which comprises comparator 48, resistor R7 and capacitor C3. Of course, it should be remembered from the above discussion of the first timer that a predetermined reference voltage is required on the non-inverting input of comparator 48, which is determined by the voltage divider function of resistors R4 and R5.

As the second timer approaches a timed-out condition, i.e., capacitor C3 being fully charged, the voltage at circuit point 49 (waveform 63) exceeds the potential established at circuit point 46, i.e., the reference voltage. This causes the outputs of comparators 50 and 51 to be turned-off, i.e., in the open collector state, thereby providing an unregulated D.C. positive pulse 25 (FIG. 4E) at circuit point 52 via resistor R8. As can be seen from FIGS. 4C and 4D (ringing mde), several zero level pulses, for example, 61a–61d may be required before capacitor C3 is sufficiently charged to trigger comparator 50 and 51 to the OFF state. The number of such pulses being required would basically depend on the ringing signal frequency, with the time constant of capacitor C3 and resistor R7 being predetermined by the component values, i.e., T=RC.

A positive signal 25 on the gate terminal of Q1 will turn the A.C. switch 16 on and apply alternating current 64 (see FIG. 4F ringing mode) to the load annunciator(s) 17 for as long as the turn-on signal 25 (see FIG. 4E) is applied, i.e., while ringing signals are being detected. Removing this signal 25 will turn the A.C. switch OFF. Signal 25 is removed when the outputs of comparators 50 and 51 are turned-on, i.e., in the closed collector state, which connects circuit point 52 to the circuit common 42 potential turning Q1 OFF. This occurs when ringing signals are no longer detected by the telephone line interface circuit 13. For example, with no ringing signals on terminals 33 and 34, circuit point 44 is maintained at the high supply rail 43 potential. This causes comparator 45 to be turned-off, i.e., open collector, which allows the first timer to time-out charging capacitor C2 to supply rail 43 potential. This causes comparator 48 to be turned-on which places circuit point 49 at circuit common 42 potential. With circuit point 49 at a lower potential than the reference voltage (circuit point 46), comparators 50 and 51, as noted above, are turned-on.

Since the operation of the A.C. switch is fully described in U.S. Pat. No. 3,487,231 issued Dec. 30, 1969 to Lloyd H. Dixon, Jr. the teachings of which are incorporated herein by reference to the extent necessary, it will not be described herein to avoid prolixity. Briefly, however, applying a trigger pulse to the gate electrode of thyristor Q1, causes it to latch on for the duration of the positive half cycle of the AC supply voltage 64. During this positive half cycle, anode current from thyristor Q1 will flow through load 17 and diode D1. When the supply voltage drops to zero, thyristor Q1 will switch off. When the AC supply voltage crosses zero in the negative direction, a second positive pulse is applied from trigger source 14 to the gate electrode of thyristor Q1, causing a reverse anode current to flow from the anode of thyristor Q1. This reverse anode current is blocked by the diode D1 and is thereby caused to flow into the gate electrode of thyristor Q2. Since at this instant the supply voltage is negative, thyristor Q2 is biased in the forward direction and will, therefore, latch on for the duration of the negative half cycle of the supply voltage, allowing load current to flow during this half cycle. When the supply voltage again passes through zero, thyristor Q2 will turn off. Operation continues similarly for each half cycle of the supply voltage. The series network of resistor R13 and capacitor C6 is used to limit the rate of voltage rise across the back-to-back SCR network Q1 and Q2 of the A.C. switch 16. Varistor CR5 is used to limit the peak voltage across the back-to-back SCR network Q1 and Q2.

The operation of the telephone annunciator extender 10 in response to dial pulses (see FIG. 4A dialing mode) will now be discussed. Typically, dial pulses or transitions are transmitted over the tip and ring lines. Therefore, the telephone annunciator extender 10 must be capable of distinguishing or discriminating between dial pulses and ringing signals so as not to actuate the remotely located annunciator(s) 17 during dialing at the subscriber station 11. Typical dial pulses are illustrated in FIG. 4A dialing mode. As noted above, the telephone line interface circuit 13 flows current, i.e., functions to couple signal information to the signal detector and discriminator circuit 14, when a changing input voltage signal having a predetermined time-rate-of-change is presented across terminals 33 and 34.

As can be seen from FIG. 4A dialing mode, typical dial pulses 65 are spaced apart and have relatively short pulse periods 66, 66b, 67 and 67b during which the voltage rate-of-change is such to cause current flow in diode 38 and, therefore, a corresponding zero level pulse 68, 69, 70 and 71, respectively, at circuit point 44. The slow voltage-rate-of-change pulse periods 66a and 67a may approximate a D.C. to ten hertz rate-of-change which is too slow to cause sufficient current through diode 38 for switching transistor 40 to the on state. Thus, during the periods 72 and 73 between dial pulses and during slow pulse transition periods 66a and 67a, the potential at circuit point 44 substantially equals the positive supply rail 43 potential (see positive pulse periods 74-78). The high potential at circuit point 44 during periods 74-78 causes comparator 45 to be turned-off, i.e., in the open collector state, which enables the first time (capacitor C2) to time-out (fully charge) as indicated by positive rising pulses 79-83 (FIG. 4C dialing mode). The relatively short pulses 68-71 result in pulses 84-87, respectively, at circuit point 47. These pulses 84-87 at circuit point 47 switch comparator 48 to the open collector state which enables the second timer (capacitor C3) to begin to charge positively (see pulses 88-91). However, the second timer is reset to zero by pulses 79-83, respectively, prior to the potential thereon reaching or exceeding the reference voltage potential. With the first timer being timed out for relatively long periods, i.e., pulses periods 79-83, the output of the second timer (circuit point 49) is continuously held at a lower potential (see FIG. 4D dialing mode) than circuit point 46 reference voltage. This in turn causes comparators 50 and 51 to be maintained in a closed collector state, which places circuit common potential (FIG. 4E dialing mode) on circuit point 52. With circuit point 52 at circuit common potential, the A.C. switch 16 is turned-off disconnecting the A.C. power source from the annunciator load 17 (see FIG. 4F dialing mode).

It should now be appreciated that the present invention encompasses the conceptual, physical and functional features substantially comprising:

means 13, 41 for producing a plurality of (timing) signals 61a-61l each having a duration/period generally equal and/or corresponding to a respective detected voltage varying signal(s) 60a-60l having a predetermined (minimum or range of) voltage time-rate-of-change(s), for example, as may occur during the voltage rising and falling edges of a sinusoidal telephone ringing signal 60 alternating at a frequency between 15 and 70 hertz with a nominal RMS voltage of 100 volts, and does not produce said (timing) signals in response to or during detected substantially non-varying voltage periods 60m-60w, 72 and 73 or to a voltage varying signal having a relatively slow time-rate-of-change 66a and 67a;

means 14 responsive to a plurality of said (timing) signals 61a-61l being produced without successive (timing) signals being spaced apart greater than a predetermined time period 61m-61w (approximately 4 milliseconds) for producing a control signal 25; and switch means 16 connected for being actuated by said control signal 25.

While a wide variety of types of comparators, transistors, capacitors, resistors and associated elements may be employed, the circuit components for the preferred embodiment are as follows:

| COMPONENTS - FIG. 3 | | | | |
|---|---|---|---|---|
| Capacitor: | C1 | 1 μf | | |
| | C2,C3 | .1 μf | | |
| | C4 | .33 μf | | |
| | C5 | 33 μf | | |
| | C6 | .033 μf | | |
| Resistor: | R1 | 10K ohm | R8 | K ohm |
| | R2 | 1 meg. ohm | R9 | 1K ohm |
| | R3 | 680K ohm | R10 | 3.9K ohm |
| | R4 | 178K ohm | R11 | 1K ohm |
| | R5 | 301K ohm | R12 | 3.6K ohm |
| | R6 | 43K ohm | R13 | 22K ohm |

| -continued | | |
|---|---|---|
| COMPONENTS - FIG. 3 | | |
| | R7 | 1.1 meg. ohm |
| Comparator: | 45, 48, 50, 51 | MC 3302CP - Motorola Open - Collector |
| Photo-Coupler: | 41 | 4N35 |
| Varistor: | CR2, CR5 | V150LA1 |
| Zener Diode: | VR1 | 1N4747 |
| Zener Diode: | VR2 | 1N5239 |
| Diode: | CR3 | 1N4007 |
| Diode: | CR4 | 1N5408 |
| SCR: | Q1, Q2 | C108D1 |
| Vdd = 9.1 volts | | |
| Vref. at ckt. point 46 = 5.7 volts | | |

While there has been described herein what is considered to be the preferred embodiment of the invention, other modifications may occur to those skilled in the art, for example, comparators 45,48, 50 and 51 may be replaced by other switch means and the time constant of the first and second timers (R6C2, R7C3) may be varied to respond to signals on the telephone line having higher frequencies than ringing signals, therefore it is intended that the appended claims are to cover all such modifications which fall within the spirit and scope of the invention as defined by the appended claims.

What we claim is:

1. Apparatus for controlling a device in response to voltage varying portions of a single ringing signal on a telephone line, said apparatus comprising:

first means connected to said telephone line for producing first signals in response to voltage variations on said telephone line in excess of a predetermined voltage time-rate-of-change;

second means coupled to said first means, for providing a control signal only in response to a series of first signals having no more than a predetermined time between each of the successive first signals; and third means for controlling a device in response to the control signal provided by said second means.

2. Apparatus as recited in claim 1, wherein:

said single ringing signal comprises an AC ringing signal having a frequency of between about 15 hertz and about 70 hertz and wherein said first signals comprise pulses having a duration of from about 3.5 milliseconds to about 33 milliseconds with each of said pulses generally corresponding in duration with the voltage varying portions of said AC ringing signal which have in excess of said predetermined voltage time rate-of-change.

3. Apparatus as recited in claim 1, wherein:

said control signal is provided continuously thereafter for so long as said first signals continue to be produced with no more than said predetermined time between each of the successive first signals.

4. Apparatus as recited in claim 3, wherein:

said predetermined time between each of the successive first signals is approximately 4 milliseconds.

5. Apparatus as in claim 1, wherein:

the second means comprises a first switch means actuated by said first signal to control a first timer to provide a first voltage state and actuated without production of said first signal to control said first timer to provide a second voltage state within a predetermined time period, a second switch means actuated by said first voltage state to control a second timer to provide a third voltage state and actuated by said second voltage state to provide a fourth voltage state, and third switch means actuated by said third voltage state to provide said control signal at an output and actuated by said fourth voltage state to remove said control signal from said output.

6. Apparatus as recited in claim 5, wherein:
the third switch means comprises a power switch having input terminals connectable to a source of electrical potential and output terminals connected to said device, said power switch having a control input responsive to said control signal to electrically connect said input terminals with said output terminals.

7. Apparatus as recited in claim 6 and further including:
a dual AC/DC power circuit having input terminals coupled to a source of AC power and output terminals coupled to both said power switch and to said second means, said dual AC/DC power circuit further including means for rectifying AC power to produce a DC power source for powering said second means.

8. Apparatus as recited in claim 1 wherein said second means includes a first comparator that is maintained non-conductive in the absence of said first signal and a first capacitor coupled to the output of the first comparator that is chargeable when the first comparator is non-conductive;
a second comparator having an input coupled to said first capacitor and being maintained conductive when said first capacitor is charged to a predetermined level, and a second capacitor coupled to the output of said second comparator that is shunted by said second comparator when it is conductive, but being otherwise chargeable, said second capacitor being coupled to switch circuit means to provide said control signal,
and wherein a plurality of periodic first signals triggers said first comparator into a plurality of conductive periods and non-conductive periods shunting said first capacitor periodically, and said first capacitor is insufficiently chargeable during the non-conductive periods to reach said predetermined level and maintain said second comparator conductive, said second comparator thereby being triggered to and maintained in a non-conductive state while the periods between said first signals are each less than a predetermined period of time and permitting the second capacitor to be charged, said second capacitor thereby being charged over a plurality of periods of said first signal to trigger said switch circuit means and to provide said control signal.

9. Circuit apparatus for controlling one or more annunciators in response to ringing signals on a telephone line, said apparatus comprising:
a telephone line interface circuit comprising a rectifier means electrically connected to the telephone line for producing a plurality of discrete unidirectional current signals each corresponding to a voltage varying portion of each ringing signal detected, and a photocoupler means responsive to each said current signal for producing a discrete corresponding pulse electrically isolated from the telephone line;
a timer means having a first switch responsive to each said pulse for controlling a first RC timer circuit to provide a first voltage level signal corresponding thereto, a second switch responsive to a plurality of said first voltage level signals being provided without more than a first predetermined period between any two successive first voltage level signals for controlling a second RC timer circuit to provide a second voltage level signal within a second predetermined period, and a third switch responsive to said second voltage level signal for providing a control pulse;
a dual AC and DC power circuit having input terminals connectable to an AC power source and having means for rectifying AC power to produce a DC power source for powering said timer means; and
an AC switch means having AC output terminals electrically connectable with said input terminals of said AC and DC power circuit in response to said control pulse, said AC output terminals being connectable to said one or more annunciators.

10. Apparatus for controlling a device in response to voltage varying signals on a telephone line, said apparatus comprising:
(a) first means connected to said telephone line for producing first signals, each of said first signals having a duration corresponding to a period said voltage varying signals have a predetermined voltage time-rate-of-change;
(b) second means responsive to a plurality of said first signals being produced within a predetermined period for providing a control signal, said second means including:
(1) first switch means responsive to each of said first signals for providing first voltage level signals responsive thereto;
(2) second switch means responsive to said first switch means for providing a second voltage level only in response to a plurality of first signals without more than a predetermined time period between successive first signals; and
(3) third switch means responsive to said second voltage level signal for providing said control signal; and
(c) means actuated by said control signal for controlling said device.

* * * * *